Aug. 11, 1936.  A. GERSTENBERG  2,050,654
APPARATUS FOR KNEADING OF MARGARIN AND OTHER EDIBLE FATTY SUBSTANCES
Filed Oct. 7, 1932  2 Sheets-Sheet 1

INVENTOR
AAGE GERSTENBERG
Emil Bönnelycke
ATTORNEY

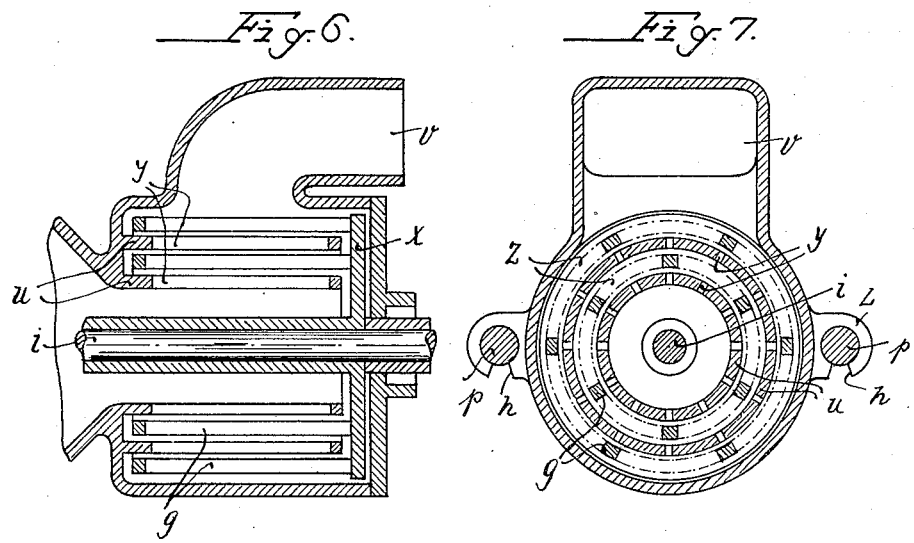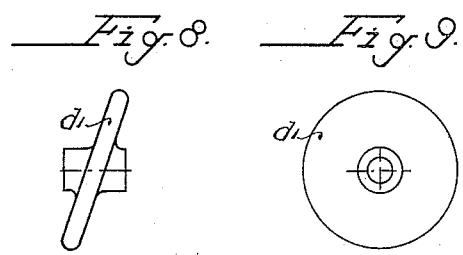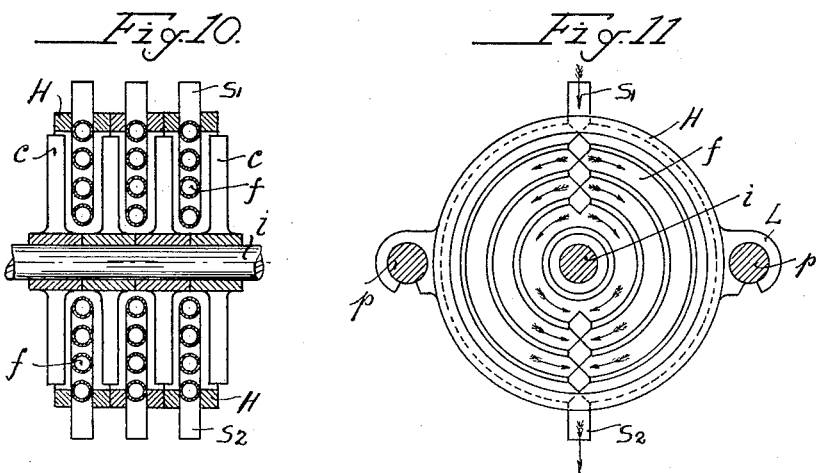

Patented Aug. 11, 1936

2,050,654

UNITED STATES PATENT OFFICE 2,050,654

APPARATUS FOR KNEADING OF MARGARIN AND OTHER EDIBLE FATTY SUBSTANCES

Aage Gerstenberg, Frederiksberg, near Copenhagen, Denmark

Application October 7, 1932, Serial No. 636,772 In Denmark October 15, 1931

10 Claims. (Cl. 99—122)

In the manufacture of margarin and other edible fatty substances, it is well known that the latter are cooled down, for instance on rotary cooling drums or in a jet of cold water, which causes the material to assume the shape of thin shavings or small grains of relatively firm consistency, and the mass thus produced is subjected to a kneading process, by which the mass is worked together so as to form a homogeneous substance of suitable consistency.

Experience has shown that the processes and apparatuses heretofore proposed for kneading of margarin and other edible fatty substances are not able to perform an efficient kneading of edible fatty substances of various compositions, by simple means, and under all conditions, i. e. without regard to the quality or the composition of the substance to be treated, the temperature of the latter and of the surroundings etc. One of the reasons for this failure is that heretofore it has not been possible to adjust the composition or nature of the kneading apparatus according to the substance to be treated, in such a manner that the substance is kneaded in just the manner that is most suitable for its composition. As margarins at various times of the year and at various places of manufacture have widely varying compositions, it will accordingly be desirable to be able to vary the treatment to be given the substance in the kneading machine. This is important to the manufacture of a homogeneous, uniformly kneaded product.

In all of the heretofore known machines for kneading of edible fatty substances, the quantity of substance that is fed into the kneading chambers is further dependent on the quantity of substance supplied, during the same period, to the feeding hopper or supply opening of the apparatus. As the thoroughness with which the substance is treated in the kneading machine, is dependent on the length of time during which the substance stays therein, and consequently depends on the quantity of substance supplied per unit of time, it will be necessary, in order to secure a satisfactory kneading, to take care that the substance shall be supplied regularly in certain suitable quantities per unit of time, either by hand or by various conveying devices operating independently of the machine, such as conveyor bands and the like. This method of feeding is subject to serious difficulties and requires a constant inspection of the apparatus, for which reason the method is rather impractical.

Kneading machines have certainly been produced before, which apparently would be able to supply a constant quantity of material per unit of time, viz. kneading machines in which a worm rotating at constant speed feeds the substance into the machine. Such a worm, however, conveys only a constant quantity by volume through the machine per unit of time. Now since the substance to be kneaded generally appears in the shape of fine flakes or grains, the specific gravity of which is highly dependent on the temperature, the quantity by weight conveyed per unit of time will therefore vary with the temperature.

The present invention has for its object the removal of these drawbacks.

In order to facilitate the manufacture of a uniform product independently of the composition of the latter, the kneading machine according to the invention will be composed of several independent units mutually interconnected in series and forming each a complete unit for treatment of the substance, and being each removable or exchangeable with any other one of the said units, in such a manner that the entire kneading machine can be formed by combining a greater or smaller number of said separate units. The first unit of the series forms a feeder mechanism, which is suitably constructed in such a manner that per unit of time it presses a certain predetermined quantity of substance through the remaining part of the kneading machine, no matter whether during the same period a greater quantity of substance be introduced into the supply chamber of the feeding mechanism, and no matter whether this quantity of substance be of a higher or lower specific gravity. The other units in the machine will generally be of different natures, one or more thereof containing kneading members, while others contain tempering members, and, maybe, members effecting a thorough mixing or supplementary kneading of the mass of substance driven through the tempering units.

As the apparatuses or machines, in which the substance to be treated has been cooled down and crystallized, can generally not be expected to have a constant capacity, and since the specific gravity of the substance will not be constant, the capacity of the feeder mechanism should be adjustable according to the momentary requirement.

The feeder mechanism driving the substance through the kneading machine may be of any suitable known kind, and the regulation of the capacity thereof may be effected in various manners, for instance if the feeder mechanism contains worms, then by modification of the number of revolutions of the latter or, if the feeder mechanism contains feed rollers, then by variation of the distance between the said rollers, which otherwise may suitably be driven at constant speed.

As mentioned above, the units of the machine that are situated behind the feeder apparatus will generally be of different kinds. They are constructed in such a manner that they can be interchanged, and in such a manner that one or more thereof can be omitted, and the other ones can be combined so as to form a complete but smaller machine. The various units may either be combined group-wise so as to form main sections containing one or more uniform units, or they may be combined alternately, so that after a unit of a certain nature there follows a unit of some different nature, all depending on the composition etc. of the substance to be treated.

In order that a suitable consistency may be given, by the kneading, to the substance under treatment, the kneading must be performed under such circumstances that the temperature will be increased by several degrees. This result has formerly been attained by a very powerful kneading, which requires a considerable mechanical work, however, and may partly be avoided, if the substance be given the desired increase in temperature by other means, viz. by causing the substance to come into contact with surfaces the temperature of which is maintained constant by suitable means, for instance moderately hot water.

It is, however not only necessary to bring the substance into contact with tempering members, but it is also necessary, during the tempering of the substance, to maintain the same in constant motion, in such a manner that new parts of the substance will constantly come into contact with the tempering surfaces. For the satisfaction of this requirement, the motion through the machine imparted to the substance by the feeder mechanism will not be sufficient, but the action of the feeder mechanism in moving the substance has to be supplemented by the action thereon of other conveyor means, the mutual axial distance of which should be made as small as possible. According to the invention this object may suitably be attained by constructing the tempering members as a system of hollow rings, mutually co-axial and co-axial to the kneading machine. Tempered water is directed through these hollow rings, and rotary bodies, for instance disks with radial slots are disposed on either side of the rings. The kneading members employed may be bodies of any suitable known nature, for instance kneader worms or kneader rollers, or according to the invention the kneading members may consist each of a rotary disk with elliptic periphery and with its plane disposed obliquely relatively to the axis of rotation, in such a manner that the projection on a plane at right angles to the said axis will be circular.

One or more of the units of the kneading machine may be provided with an opening, by way of which any air contained in the substance to be treated and forced out from the same by the kneading may escape or be sucked away.

As mentioned above, the kneading machine is composed of several units connected in series, and these units are suitably supported on a common bedding, along which the units can slide, and on which they can be interconnected by suitable means, so that at any time any one of the units together with the rotary kneading members or the like disposed therein can be removed by undoing of the connections between the various units and removal of the units concerned from the bed and removal of the members rotating in the units, for instance kneading members, from a shaft common to all the members and passing through all the units, after which the remaining units are placed together so as to form a smaller (shorter) kneading machine.

Instead of the kneading machine being constructed with one single set of treatment chambers interconnected in series, the machine may be fitted with several sets of treatment chambers interconnected in series, for instance in such a manner that each individual unit of the machine contains two or more chambers arranged side by side. The chambers in each individual unit are connected in series with a chamber in each of the other adjacent units, in such a manner that there are formed two or more rows of chambers interconnected in series, each of which rows of chambers contains a shaft common to all the chambers in the row and supporting the members rotating in the chambers. The various shafts thus provided are all driven from one common driving mechanism, either at the same or at different rotary speeds, each of which can be regulated.

The further details of the invention will appear from the following description of the constructions shown on the drawings of a machine constructed according to the invention for kneading of margarin, and the kneading and tempering devices used in the apparatus.

Figure 1:
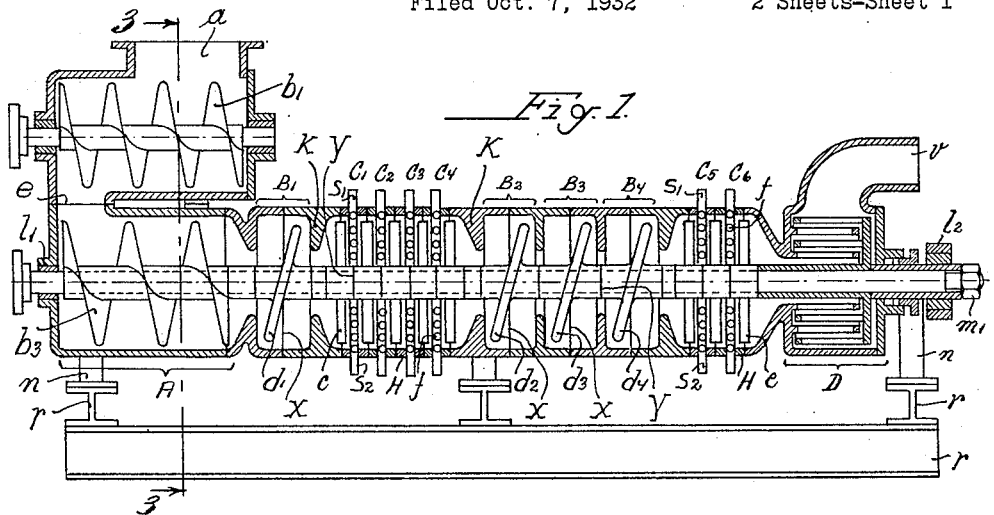
Fig. 1 shows a longitudinal section of a kneading machine.
Figure 4:
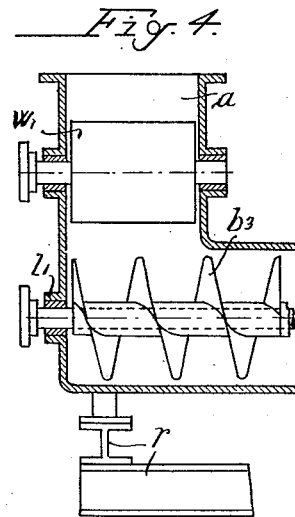
Figure 5:
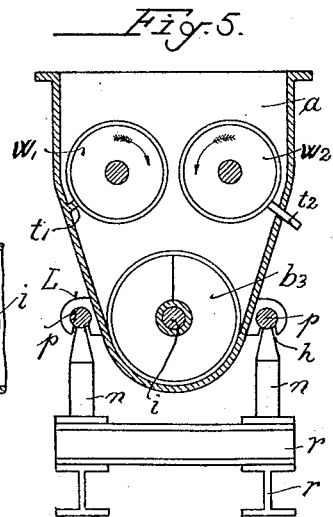

Fig. 4 shows a longitudinal section of a modified construction of the feeder mechanism for the kneading machine shown in Fig. 1, Fig. 5 shows a cross-section of the same feeder mechanism, Fig. 6 shows a longitudinal section, to a larger scale, of a supplementary kneading or mixing section of the machine, Fig. 7 shows a cross-section of the section shown in Fig. 6, Figs. 8 and 9 show a kneading member in end and side elevation, respectively, Fig. 10 shows a longitudinal section, similarly to a larger scale, of a tempering section, and Fig. 11 shows an end elevation of the tempering section.

Figure 2:
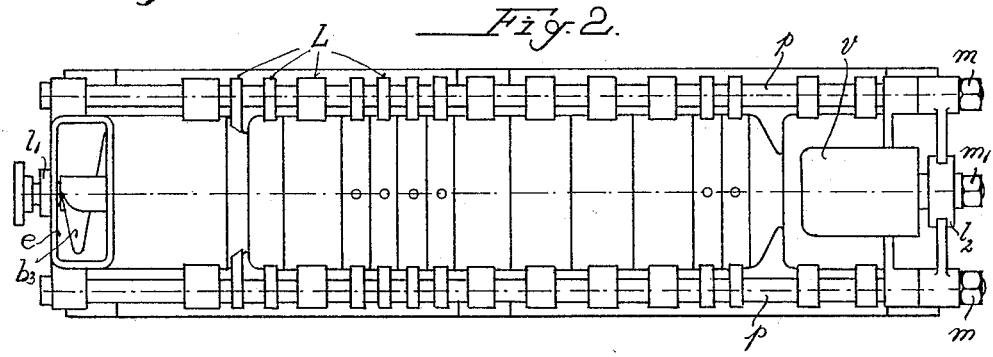
Fig. 2 shows the same in top view.

The machine shown in Figs. 1 and 2 is composed of several separate units or sections A, $B_1$—$B_4$, $C_1$—$C_6$ and D. The section A is a feeder mechanism, which consists of a supply chamber $a$ containing two feeder worms $b_1$ and $b_2$ situated side by side and adapted to convey the substance from the supply chamber $a$ by way of an aperture $e$ in the bottom of the same and down to a worm $b_3$, which presses the substance through the sections $B_1$—$B_4$ and $C_1$—$C_6$ and D. The worms $b_1$ and $b_2$ can be driven by means of driving devices not shown, in such a manner that they can be caused to rotate at variable speed, so that the quantity conveyed down to the worm $b_3$ per unit of time can be adjusted according to the requirements. The three worms $b_1$, $b_2$, $b_3$, in the section A, in combination with the supply chamber $a$ form the feeder mechanism, in which the two worms $b_1$ and $b_2$, as mentioned above, serve to regulate the quantity of substance supplied to the kneading machine, while the worm $b_3$ serves to drive the substance through the remaining part of the kneading machine.

The sections $B_1$—$B_4$ are kneading sections containing kneading members $d_1$—$d_4$. These kneading members are disposed on a common shaft $i$, and consist each of an obliquely disposed plane disk with elliptical periphery, the projection of which on a plane at right angle to the shaft $i$ forms a circle. The periphery of the disks $d_1$—$d_4$ fits rather tightly to the inner face of the outer casing of the machine, and each disk will mainly act as a kneading member reciprocating in axial direction in the section concerned and performing a rubbing and pressing action on the substance, whereby an efficient kneading effect will be attained.

The sections $C_1$—$C_6$ are heating or tempering sections, and are shown to a larger scale in Figs. 10 and 11. In the construction here shown, four such sections are provided between the kneading sections $B_1$ and $B_2$, and two such tempering sections $C_5$ and $C_6$ are provided between the last one of the kneading sections $B_4$ and a section D serving to perform a supplementary kneading in the machine.

The tempering sections $C_1$—$C_6$ consist each of a number of hollow rings $f$, which are co-axial mutually as well as to the shaft $i$. The outermost ring is attached to an annular segment H of the outer casing of the kneading apparatus, and the inner ring in each tempering section is attached to two pipes $S_1$ and $S_2$, Figs. 10 and 11, serving to supply and discharge, respectively, a tempering liquid that is directed through the rings. On either side of the mutually co-axial rings $f$, bodies $c$, Figs. 1, 10 and 11, are provided, which rotate together with the shaft $i$, and may be of any suitable construction, for instance wings or bars disposed radially on a hub fixed on the shaft $i$.

The bodies $c$ have to maintain in constant motion the substance passing through the tempering sections and, thereby, to secure a uniform heating. A suitable heating medium is directed through a pipe $S_1$ into the rings $f$, and is discharged from there by way of the outlet pipe $S_2$.

The section D forms a supplementary kneading or mixing section, into which the substance is driven after having passed the kneading and tempering sections. As shown by Figs. 6 and 7, this section contains two stationary cylinders $u$ coaxial to the shaft $i$, Figs. 6 and 7, and fitted with radial slots $y$ through which the substance under treatment is forced to move. Between the two cylinders $u$ and outside of the outer one of these, bars $g$ are provided, which are parallel to the shaft $i$, and at one of their ends are attached to a disk $x$ fixed on the shaft, while the other ends of the said bars are held together group-wise, by means of rings $z$.

By action of the bars $g$ rotating together with the shaft $i$, the quantity of material that is pressed through the slot $y$ in the cylinders $u$ will be exposed to a very powerful supplementary mixing and kneading process, before leaving the kneading machine by way of an outlet branch $v$ provided on this section of the machine.

In the construction shown in Figs. 6 and 7, the disk $x$ with the bars $g$ attached thereto is disposed on the shaft $i$, so that the said bars rotate together with the shaft. It may, however, under certain circumstances be suitable to give the bars $f$ a higher or lower rotary speed than the shaft $i$, in which case they are coupled to the shaft, or to a separate driving mechanism, by means of suitable change speed gears, which in manner known per se can be driven at a suitable, maybe variable, rotary speed.

Besides being used for mixing and supplementary kneading the section D may also, if desired, be used for heating or cooling of the substance, in which case the bars $g$ are made hollow. In that case a heating or cooling medium is directed through the bars, the said medium being supplied for instance through the shaft $i$ by way of means not shown here but being of a nature known per se.

Figure 3:
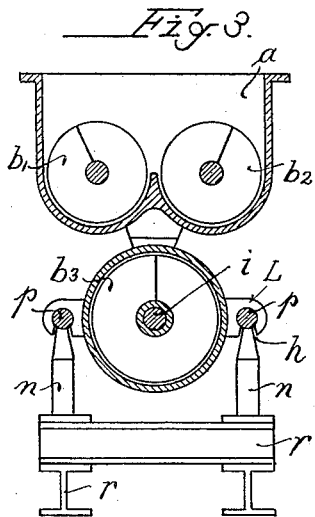
Fig. 3 shows a cross-section of the same, along the line 3—3 in Fig. 1.

Figs. 4 and 5 show a construction of a feeder mechanism in which the regulating members do not consist of worms $b_1$ and $b_2$ as in the construction shown in Figs. 1 to 3, but of rollers $w_1$ and $w_2$, the directions of rotation of which are shown by the arrows in Fig. 5. By the rotation of these rollers the substance is carried down through the space between the rollers and against two scraper rails $t_1$ and $t_2$, which are in contact with the rollers $w_1$ and $w_2$ along their entire length. The substance drops from the scraper rails $t_1$ and $t_2$ down on to the worm $b_3$, which presses the substance through the kneading machine. The rollers $w_1$ and $w_2$ are driven at constant speed by means of driving devices not shown, and the capacity of the feeder mechanism is varied in that the rollers are approached to or removed from one another, one or both of the rollers being journaled in bearings, in which the rollers in known manner can slide transversely to the axis of rotation. The scraper rail $t_1$ or $t_2$ belonging to an adjustable roller must be disposed in such a manner that it will partake in the transverse motion of the roller concerned.

As mentioned above, the kneading machine is composed of several units, each of which can be exchanged or removed. This composition is effected by a suitable division of the fixed part (casing) and rotary system (kneading members, etc.) of the kneading machine.

In order to facilitate the assembling and separation of these units, and in order to facilitate the insertion and removal of one or more sections of the machine, the stationary part (casing) of the latter is resting on guides $p$, in such a manner that all sections at the same time can be screwed together by means of only two nuts $m$. The rotary system of the machine, i. e., the system formed by all the mutually coaxial rotary feeding and kneading members, has one common shaft, viz. the shaft $i$, and is tightened on the same by means of one single nut $m_1$. The shaft $i$ is supported in two bearings $l_1$ and $l_2$, which rest on the guides $p$. The latter are supported by a suitable number of posts $n$, which rest on a fixed base or foundation $r$. In order that the various sections of the machine may slide along the guides $p$ and be placed anywhere on the latter, the bearing arms L by means of which the individual sections rest on the guides $p$ are fitted with notches $h$, Fig. 3, so that they can freely pass the supporting posts $n$.

As explained above, the machine is composed of various units. It should be noted, however, that the sections X, according to which the stationary part of the kneading machine is divided into sections or units, in several cases will not co-incide with the sections Y, according to which the rotary system of the machine is divided into corresponding units, but the sections X are selected in such a manner that by the omission of any one of the units into which the fixed part of the machine is divided, and by the removal, in the rotary part of the machine, of one of the members that work in connection with the said unit, it will be possible to assemble the remaining units of the fixed as well as of the rotary part so as to form a new machine.

Fig. 1 will show directly how this is done. Between certain of the units transition sections K are provided, which according to the circumstances may have to be removed, for instance an omission of the kneading section $B_1$ will have for its consequence the removal of the succeeding transition sections K in order to enable the first one of the tempering sections $C_1$ to be connected directly to the feeder section.

I claim as my invention:

1. A machine for kneading edible fatty substances comprising a number of different, removable and mutually exchangeable working units interconnected in series and containing each at least one treatment section, a feeding device arranged to feed the fatty substance to be treated to the first of said units and means to adjust the capacity of the feeding device independently of the capacity of the said units.

2. A machine for kneading edible fatty substances comprising a number of different, removable and mutually exchangeable working units interconnected in series, each unit comprising a casing and a kneading member housed therein, an inlet on the first of the said units, a feeding device tightly connected to the said inlet and adapted to feed the fatty substance to be treated to the unit connected to the feeding device, and means to adjust the capacity of the feeding device independently of the capacity of the working units.

3. A machine for kneading edible fatty substances comprising several different, removable and mutually exchangeable working units interconnected in series, a feeding device, means to adjust the capacity of the feeding device relatively to the capacity of the remaining portion of the entire machine, common guides to support the working units and the feeding device, and means for detachably attaching the said units to the said guides so that any of the units may be removed and the remaining units assembled to form a kneading machine of a different suitable composition, adjusted according to the nature of the edible fatty substance to be treated and other conditions.

4. A machine for kneading fatty substances comprising a casing divided in several separate sections interconnected in series, common guides on which the said sections are adjustably mounted, a feeding device of adjustable capacity tightly connected to the first section of the casing, a rotary shaft extended through all of the said sections, rotary working members detachably mounted on the said shaft within the said sections of the casing so as to allow any of the said working members and the adjoining section of the casing to be removed and the remaining sections and rotary working members to be assembled to form a kneading machine of a different suitable composition.

5. A machine for kneading fatty substances comprising a casing consisting of several sections interconnected in series, rotary kneading members comprising plane discs with elliptical periphery obliquely disposed relatively to the axis of rotation located in some of the said sections, rotary working members of different kind located in the remaining sections of the casing, a common rotary shaft extended through all of the said sections and supporting the rotary working and kneading members, common guides to support the said sections of the casing, a feeding device comprising a casing tightly connected to the first sections of the casing of the kneading machine, a feeding mechanism located in the casing of the feeding device, and means to adjust the working capacity of the said feeding mechanism independently of the working capacity of any other part of the entire machine.

6. A machine for kneading fatty substances comprising a casing consisting of several sections interconnected in series, rotary kneading members comprising plane discs with elliptical periphery obliquely disposed relatively to the axis of rotation located in some of the said sections, rotary working members of different kind located in the remaining sections of the casing, a number of mutually parallel rotary shafts extended through all of the said sections and supporting the rotary working and kneading members, common guides to support the said sections of the casing, a feeding device comprising a casing tightly connected to the first section of the casing of the kneading machine, a feeding mechanism located in the casing of the feeding device, and means to adjust the working capacity of the said feeding mechanism independently of the working capacity of any other part of the entire machine.

7. A machine for kneading edible fatty substances comprising a plurality of interchangeable detachably connected treatment sections, each section containing a plurality of units, each unit consisting of a stationary member and a rotary member, all of said rotary members being mounted on a common shaft extending substantially axially of the assembled stationary members, the number of units to each section being variable to meet the requirements of the material undergoing treatment, and a feed section for forcing the material through the treatment sections at variable rates.

8. A machine for kneading edible fatty substances comprising a plurality of interchangeable detachably connected treatment sections, each section containing a plurality of units, each unit consisting of a stationary member and a rotary member, all of said rotary members being mounted on a common shaft extending substantially axially of the assembled stationary members, the number of units to each section being variable to meet the requirements of the material undergoing treatment, a feed section for forcing the material through the treatment sections at variable rates, and a tempering section associated with the treatment sections, said tempering section consisting of a plurality of stationary units, each comprising a heat exchange element and a rotary element for agitating the material adjacent the heat exchange element.

9. A machine for kneading edible fatty substances comprising a plurality of interchangeable detachably connected treatment sections, each section containing a plurality of units, each unit consisting of a stationary member and a rotary member, all of said rotary members being mounted on a common shaft extending substantially axially of the assembled stationary members, the number of units to each section being variable to meet the requirements of the material undergoing treatment, a feed section for forcing the material through the treatment sections at variable rates, a tempering section associated with the treatment sections, said tempering section consisting of a plurality of stationary units each comprising a heat exchange element and a rotary element for agitating the material adjacent the heat exchange element, each of the heat exchange elements comprising a plurality of concentrically arranged spaced annular tubular members, and means for supplying and discharging a heating fluid to and from said members.

10. A machine for kneading edible fatty substances comprising a plurality of interchangeable detachably connected treatment sections, each section containing a plurality of units, each unit consisting of a stationary member and a rotary member, all of said rotary members being mounted on a common shaft extending substantially axially of the assembled stationary members, the number of units to each section being variable to meet the requirements of the material undergoing treatment, a feed device comprising a casing, rotary feeding members therein, and means for varying the speed of the rotary feeding members relative to the speed of the rotary members of the treatment sections.

AAGE GERSTENBERG.